United States Patent
Ho et al.

(10) Patent No.: US 11,098,171 B2
(45) Date of Patent: Aug. 24, 2021

(54) TRANSPARENT POLYIMIDE FILM MANUFACTURING METHOD

(71) Applicant: TAIMIDE TECH. INC., Hsinchu (TW)

(72) Inventors: Yi-Hsueh Ho, Hsinchu (TW); Yi-Ting Liu, Hsinchu (TW)

(73) Assignee: TAIMIDE TECH. INC., Hsinchu (TW)

( * ) Notice: Subject to any disclaimer, the term of this patent is extended or adjusted under 35 U.S.C. 154(b) by 223 days.

(21) Appl. No.: 16/576,920

(22) Filed: Sep. 20, 2019

(65) Prior Publication Data

US 2020/0095388 A1 Mar. 26, 2020

(30) Foreign Application Priority Data

Sep. 21, 2018 (TW) ................. 107133363

(51) Int. Cl.
*C08J 5/18* (2006.01)
*C08F 22/38* (2006.01)
*C08F 22/04* (2006.01)

(52) U.S. Cl.
CPC ............. *C08J 5/18* (2013.01); *C08F 22/04* (2013.01); *C08F 22/38* (2013.01); *C08J 2379/08* (2013.01)

(58) Field of Classification Search
CPC .......... C08J 5/18; C08J 2379/08; C08F 22/38; C08F 22/04
USPC ........................................ 524/600
See application file for complete search history.

(56) References Cited

U.S. PATENT DOCUMENTS

| | | | | |
|---|---|---|---|---|
| 9,982,103 | B2 * | 5/2018 | Ju | C08G 73/1003 |
| 2009/0078453 | A1 * | 3/2009 | Jung | H05K 1/0346 174/254 |
| 2017/0190880 | A1 * | 7/2017 | Jo | C09B 69/101 |
| 2017/0306093 | A1 * | 10/2017 | Matsumaru | C08J 7/046 |
| 2018/0044476 | A1 * | 2/2018 | Park | C08G 73/1042 |

* cited by examiner

*Primary Examiner* — Michael Bernshteyn
(74) *Attorney, Agent, or Firm* — Li & Cai Intellectual Property (USA) Office

(57) ABSTRACT

A transparent polyimide film manufacturing method includes following steps: producing a polyimide film having a tensile modulus of elasticity greater than 5.4 GPa ((N/m²)×109), a light transmittance greater than 85%, and a chromaticity b* less than 2; providing an ether-free dianhydride and a diamine to form an ether-free polyamic acid; reacting the ether-free polyamic acid with an aromatic cyclic dianhydride to form a copolymerized polyamic acid; and chemically cyclizing the copolymerized polyamic acid to form a transparent polyimide film.

4 Claims, 1 Drawing Sheet

TRANSPARENT POLYIMIDE FILM MANUFACTURING METHOD

CROSS-REFERENCE TO RELATED PATENT APPLICATION

This application claims the benefit of priority to Taiwan Patent Application No. 107133363, filed on Sep. 21, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transparent polyimide film manufacturing method, and more particularly to a manufacturing method for a transparent polyimide film having a large tensile modulus, better scratch resistance and a more convenient manufacturing process.

BACKGROUND OF THE DISCLOSURE

Polyimide film is commonly used in flexible circuit boards processed at high temperature for its excellent heat resistance and mechanical properties. In addition, since a transparent polyimide film has good bending resistance and optical properties, in recent years, in the field of electronic display, the polyimide film has become one of the few materials that can meet the requirements for optical characteristics and heat resistance.

Although the transparent polyimide film has good optical and temperature resistance, its scratch resistant is not good enough. The main reason is that mechanical properties of the transparent polyimide film are slightly deficient, and a tensile elastic modulus for expressing a rigidity of the material is low (less than 5 GPa). Generally, the rigidity of the polyimide film is increased by using an inorganic additive. For example, in the US Patent No. US20170306093A1, nano silicon dioxide is added to a polyimide film to enhance the rigidity and hardness of the polyimide film. However, an excessively high added amount causes fogging of the film, and generates film surface particles by agglomeration of the additive. Furthermore, U.S. Pat. No. 9,982,103B2 discloses that the use of silicon dioxide having a surface-modified with —OH functional group can improve the fogging of the polyimide film, but silicon dioxide needs to be configured to a concentration of 1% by weight of the diluent, which will cause problems such as production difficulties.

US Patent No. US20180044476A1 discloses that using more than 50 mol % of terephthaloyl chloride, with a harder anhydride monomer, a polyimide film with a large tensile modulus can be produced to improve scratch resistance and impact resistance, however, the reaction of acyl chloride and diamine will produce hydrochloric acid. Hydrochloric acid can easily cause corrosion on equipment, resulting in great difficulties in manufacturing and production.

SUMMARY OF THE DISCLOSURE

In response to the above-referenced technical inadequacies, the present disclosure provides a transparent polyimide film manufacturing method including the following steps for producing a polyimide film having a tensile modulus of elasticity greater than 5.4 GPa ($(N/m^2) \times 10^9$), a light transmittance greater than 85%, and a chromaticity b* less than 2: providing an ether-free dianhydride and a diamine to form an ether-free polyamic acid; reacting the ether-free polyamic acid with an aromatic cyclic dianhydride to form a copolymerized polyamic acid; and chemically cyclizing the copolymerized polyamic acid to form a transparent polyimide film. Polymerization conditions thereof are as described in the following formula, $((A+C)((B)^{10}+1) > 1.1$, A is a percentage of a total number of moles of the ether-free polyamic acid to a total number of moles of the copolymerized polyamic acid, B is a mole fraction of ether-free dianhydride to diamine of ether-free polyamic acid, and C is a percentage of a total number of moles of the ether-free dianhydride to the total number of moles of the copolymerized polyamic acid.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
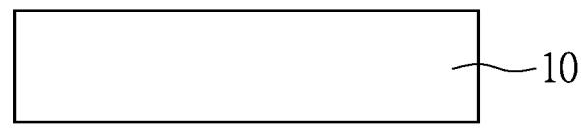
FIG. 1 is a schematic view of a transparent polyimide film of the present disclosure.
Figure 2:
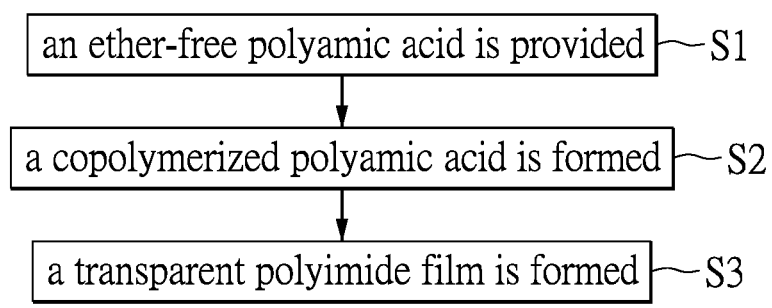
FIG. 2 is a flow chart of a transparent polyimide film manufacturing method of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, a transparent polyimide film manufacturing method of the present disclosure includes following steps for producing a polyimide film having a tensile modulus of elasticity greater than 5.4 GPa ((N/m$^2$)×10$^9$) so that the polyimide film has better scratch resistance:

Firstly, an ether-free dianhydride and diamine are formed to form an ether-free polyamic acid (S1), and the ether-free dianhydride may be cyclobutanetetracarboxylic dianhydride (CBDA), 1,2,4,5-cyclohexanetetracarboxylic dianhydride (HPMDA), 1,2,4,5-benzenetetracarboxylic anhydride (PMDA), 3,3',4,4'-benzophenonetetracarboxylic dianhydride (BTDA), bicyclo[2.2.2]oct-7-ene-2,3,5,6-tetracarboxylic dianhydride (BTA), 3,3',4,4'-biphenyltetracarboxylic dianhydride (BPDA), or hexahydro-4, 8-ethano-1H,3H-benzo [1,2-c:4,5-c'] difuran-1,3,5,7-tetrone (BODA). In the copolymerized polyamic acid, the aromatic cyclic dianhydride is 4,4-hexafluoroisopropylidene)diphthalic anhydride (6FDA), 3,3,4,4-diphenylsulfonetetracarboxylic dianhydride (DSDA), or 4,4'-oxydiphthalic anhydride (ODPA). The diamine may be 2,2'-bis(trifluoromethyl)benzidine (TFMB) or 1,4-cyclohexanediamine (CHDA), 4,4'-diamino-2,2'-dimethyl-1,1'-biphenyl (m-Tolidine), p-phenylenediamine (PDA), 2-(4-aminophenyl)-5-aminobenzoxazole.

The ether-free polyamic acid is reacted with an aromatic cyclic dianhydride to form a copolymerized polyamic acid (S2), and the aromatic cyclic dianhydride can be 4,4-hexafluoroisopropylidene diphthalic anhydride (6FDA), 3,3,4,4-diphenylsulfonetetracarboxylic dianhydride (DSDA), or 4,4'-oxydiphthalic anhydride (ODPA).

The copolymerized polyamic acid is chemically cyclized to form a transparent polyimide film (S3).

The polymerization conditions should correspond to the following formula: $((A+C)((B)^{10}+1)>0.94$, wherein A is a percentage of a total number of moles of the ether-free polyamic acid to a total number of moles of the copolymerized polyamic acid, B is a mole fraction of ether-free dianhydride to diamine of ether-free polyamic acid, and C is a percentage of a total number of moles of the ether-free dianhydride to the total number of moles of the copolymerized polyamic acid.

[Manufacture of Ether-Free Polyamic Acid Solution]

Diamine is dissolved in an organic solvent, and the organic solvent may be N,N-dimethylacetamide (DMAc), N-methylpyrrolidone (NMP), γ-butyrolactone (GBL), dimethylformamide (DMF) a co-solvent prepared by using the above solvent. The ether-free dianhydride is added slowly to the solvent after dissolution, and then stirred for six hours under constant temperature of 25° C. to form an ether-free polyamic acid solution.

[Manufacture of Copolymerized Polyamic Acid Solution]

The above ether-free polyamic acid solution is added with another diamine and stirred until the diamine is completely dissolved. The aromatic cyclic dianhydride is then added to the solvent after dissolution, and then stirred for a certain period of time under constant temperature of 25° C. to obtain a 25% solid content polyamic acid solution.

[Manufacture of Transparent Polyimide Film]

The solid content is diluted with a solvent in the above copolymerized polyamic acid solution, and then an appropriate amount of acetic anhydride and 3-methylpyridine are added respectively, and after uniformly stirring, the solution is applied to a glass plate and coated with a scraper. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film having a thickness of 10 to 100 μm.

First Embodiment

[Manufacture of Copolymerized Polyamic Acid Solution]

27.800 grams of 2,2'-bis(trifluoromethyl)benzidine (TFMB, 0.0868 mole, mole fraction 0.42 in diamine solution) is added to 412.5 grams of N,N-dimethylacetamide (DMAc), and after completely dissolving, 16.214 g of CBDA (0.0827 mole, mole fraction 0.4 in anhydride) is added. The reaction is stirred for six hours and the temperature is maintained at 25° C. to form an ether-free polyamic acid solution.

38.391 g of TFMB (0.120 mole) is added to the ether-free polyamic acid solution and stir until fully dissolved. 55.094 g of 6FDA (0.124 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

54.4 g of the above polyamic acid solution is taken, and the solid content is diluted to 17% using N,N-dimethylacetamide (DMAc). 10.9 ml of acetic anhydride and 3.7 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 41% of a total number of moles of the ether-free polyamic acid to a total number of moles of the copolymerized polyamic acid, B is the mole fraction of 0.95 of ether-free dianhydride to diamine of ether-free polyamic acid, and C is a percentage of 40% of a total number of moles of the ether-free dianhydride to the total number of moles of the copolymerized polyamic acid.

Result of the formula is $((A+C)((B)^{10}+1)=1.31$.

The transparent polyimide film prepared above has a polymerization method corresponding to the formula $((A+C)((B)^{10}+1)>1.1)$, and the tensile modulus is 5.8 GPa ((N/m$^2$)×10$^9$).

Second Embodiment

[Manufacture of Copolymerized Polyamic Acid Solution]

42.972 grams of TFMB (0.1342 mole, mole fraction 0.625 in diamine solution) is added to 412.5 grams of N,N-dimethylacetamide (DMAc), and after completely dissolving, 21.053 g of CBDA (0.1074 mole, mole fraction 0.5 in anhydride) is added. The reaction is stirred for six hours and the temperature is maintained at 25° C. to form an ether-free polyamic acid solution.

25.783 g of TFMB (0.0805 mole) is added to the ether-free polyamic acid solution and stirred until fully dissolved. 47.691 g of 6FDA (0.1074 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

54.4 g of the above polyamic acid solution is taken, and the solid content is diluted to 17% using N,N-dimethylacetamide (DMAc). 12.0 ml of acetic anhydride and 4.1 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 41% of a total number of moles of the ether-free polyamic acid to a total number of moles of the copolymerized polyamic acid, B is the mole fraction of 0.95 of ether-free dianhydride to diamine of ether-free polyamic acid, and C is a percentage of 40% of a total number of moles of the ether-free dianhydride to the total number of moles of the copolymerized polyamic acid.

Result of the formula is $((A+C)((B)^{10}+1)=1.18$.

The transparent polyimide film prepared above has a polymerization method corresponding to the formula $((A+C)((B)^{10}+1)>1.1)$, and the tensile modulus is 5.4 GPa $((N/m^2)\times10^9)$.

Third Embodiment

[Manufacture of Copolymerized Polyamic Acid Solution]

36.097 grams of TFMB (0.1127 mole, mole fraction 0.525 in diamine solution) is added to 412.5 grams of N,N-dimethylacetamide (DMAc), and after completely dissolving, 21.053 g of CBDA (0.1074 mole, mole fraction 0.5 in anhydride) is added. The reaction is stirred for six hours and the temperature is maintained at 25° C. to form an ether-free polyamic acid solution.

32.659 g of TFMB (0.1020 mole) is added to the ether-free polyamic acid solution and stir until fully dissolved. 47.691 g of 6FDA (0.1074 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

54.4 g of the above polyamic acid solution is taken, and the solid content is diluted to 17% using N,N-dimethylacetamide (DMAc). 12.0 ml of acetic anhydride and 4.1 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 51% of a total number of moles of the ether-free polyamic acid to a total number of moles of the copolymerized polyamic acid, B is the mole fraction of 0.95 of ether-free dianhydride to diamine of ether-free polyamic acid, and C is a percentage of 50% of a total number of moles of the ether-free dianhydride to the total number of moles of the copolymerized polyamic acid.

Result of the formula is $((A+C)((B)^{10}+1)=1.63$.

The transparent polyimide film prepared above has a polymerization method corresponding to the formula $((A+C)((B)^{10}+1)>1.1)$, and the tensile modulus is 7.2 GPa $((N/m^2)\times10^9)$.

Comparative Example 1

[Manufacture of Polyamic Acid]

57.598 grams of TFMB (0.1799 mole) is added to 412.5 grams of N,N-dimethylacetamide (DMAc), after completely dissolving, 79.902 g of 6FDA (0.01799 mole) is added. The solution is stirred and reacted for a certain period of time, and then stirred for a certain time under constant temperature of 25° C. to obtain a 25% solid content polyamic acid solution.

[Manufacture of Transparent Polyimide Film]

52.8 g of the above polyamic acid solution is taken, and the solid content is diluted to 16.5% using N,N-dimethylacetamide (DMAc). 10.1 ml of acetic anhydride and 3.5 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 0% of a total number of moles of the ether-free polyamic acid to a total number of moles of the copolymerized polyamic acid, B is the mole fraction of 0 of ether-free dianhydride to diamine of ether-free polyamic acid, and C is a percentage of 0% of a total number of moles of the ether-free dianhydride to the total number of moles of the copolymerized polyamic acid.

Result of the formula is $((A+C)((B)^{10}+1)=0$.

The transparent polyimide film prepared above has a polymerization method corresponding to the formula $((A+C)((B)^{10}+1)<1.1)$, and the tensile modulus is 3.6 GPa $((N/m^2)\times10^9)$.

Comparative Example 2

[Manufacture of Copolymerized Polyamic Acid Solution]

22.685 grams of TFMB (0.0708 mole, mole fraction 0.375 in diamine solution) is added to 412.5 grams of N,N-dimethylacetamide (DMAc), and after completely dissolving, 18.262 g of BTDA (0.0567 mole, mole fraction 0.3 in anhydride) is added. The reaction is stirred for six hours and the temperature is maintained at 25° C. to form an ether-free polyamic acid solution.

37.809 g of TFMB (0.118 mole) is added to the ether-free polyamic acid solution and stirred until fully dissolved. 58.744 g of 6FDA (0.132 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

39.6 g of the above copolymerized polyamic acid is taken, and the solid content is diluted to 16.5% using N,N-dimethylacetamide (DMAc). 5.6 ml of acetic anhydride and 2.9 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 34% of a total number of moles of the ether-free polyamic acid to a total number of moles of the copolymerized polyamic acid, B is the mole fraction of 0.8 of ether-free dianhydride to diamine of ether-free polyamic acid, and C is a percentage of 30% of a total number of moles of the ether-free dianhydride to the total number of moles of the copolymerized polyamic acid.

Result of the formula is $((A+C)((B)^{10}+1)=0.71$. The transparent polyimide film prepared above has a polymerization method corresponding to the formula $((A+C)((B)^{10}+1)<1.1)$, and the tensile modulus is 4.4 GPa $((N/m^2)\times10^9)$.

Comparative Example 3

[Manufacture of Copolymerized Polyamic Acid Solution]

23.929 grams of TFMB (0.0747 mole, mole fraction 0.375 in diamine solution) is added to 412.5 grams of N,N-dimethylacetamide (DMAc), and after completely dissolving, 11.723 g of BTDA (0.0598 mole, mole fraction 0.3 in anhydride) is added. The reaction is stirred for six hours and the temperature is maintained at 25° C. to form an ether-free polyamic acid solution.

39.882 g of TFMB (0.1245 mole) is added to the ether-free polyamic acid solution and stir until fully dissolved. 61.965 g of 6FDA (0.1395 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

54.4 g of the above copolymerized polyamic acid is taken, and the solid content is diluted to 17% using N,N-dimethylacetamide (DMAc). 11.2 ml of acetic anhydride and 3.8 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 34% of a total number of moles of the ether-free polyamic acid to a total number of moles of the copolymerized polyamic acid, B is the mole fraction of 0.8 of ether-free dianhydride to diamine of ether-free polyamic acid, and C is a percentage of 30% of a total number of moles of the ether-free dianhydride to the total number of moles of the copolymerized polyamic acid.

Result of the formula is $((A+C)((B)^{10}+1)=0.71$.

The transparent polyimide film prepared above has a polymerization method not corresponding to the formula $((A+C)((B)^{10}+1)<1.1)$, and the tensile modulus is 4.6 GPa $((N/m^2)\times10^9)$.

Comparative Example 4

[Manufacture of Copolymerized Polyamic Acid Solution]

20.100 grams of 2,2'-bis(trifluoromethyl)benzidine (TFMB, 0.0627 mole, mole fraction 0.315 in diamine solution) is added to 412.5 grams of N,N-dimethylacetamide (DMAc), after completely dissolving, 11.723 g of CBDA (0.0598 mole, mole fraction 0.3 in anhydride) is added. The reaction is stirred for six hours and the temperature is maintained at 25° C. to form an ether-free polyamic acid solution.

43.711 g of 2,2'-bis(trifluoromethyl)benzidine (TFMB, 0.1365 mole) is added to the ether-free polyamic acid solution and stir until fully dissolved. 61.965 g of 4,4-hexafluoroisopropylidene)diphthalic anhydride (6FDA, 0.1395 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

54.4 g of the above copolymerized polyamic acid is taken, and the solid content is diluted to 17% using N,N-dimethylacetamide (DMAc). 11.2 ml of acetic anhydride and 3.8 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 31% of a total number of moles of the ether-free polyamic acid to a total number of moles of the copolymerized polyamic acid, B is the mole fraction of 0.95 of ether-free dianhydride to diamine of ether-free polyamic acid, and C is a percentage of 30% of a total number of moles of the ether-free dianhydride to the total number of moles of the copolymerized polyamic acid.

Result of the formula is $((A+C)((B)^{10}+1)=0.98$.

The transparent polyimide film prepared above has a polymerization method not corresponding to the formula $((A+C)((B)^{10}+1)<1.1)$, and the tensile modulus is 4.6 GPa $((N/m^2)\times10^9)$.

Comparative Example 5

[Manufacture of Copolymerized Polyamic Acid Solution]

19.056 grams of 2,2'-bis(trifluoromethyl)benzidine (TFMB, 0.0595 mole, mole fraction 0.315 in diamine solution) is added to 412.5 grams of N,N-dimethylacetamide (DMAc), after completely dissolving, 18.262 g of 3,3',4,4'-benzophenonetetracarboxylic dianhydride (BTDA, 0.0567 mole, mole fraction 0.3 in anhydride) is added. The reaction is stirred for six hours and the temperature is maintained at 25° C. to form an ether-free polyamic acid solution.

41.438 g of 2,2'-bis(trifluoromethyl)benzidine (TFMB, 0.1294 mole) is added to the ether-free polyamic acid solution and stir until fully dissolved. 58.744 g of 4,4-hexafluoroisopropylidene)diphthalic anhydride (6FDA, 0.1322 mole) is added, and the solution is stirred and reacted for a certain period of time, and then stirred for a certain time under constant temperature of 25° C. to obtain a 25% solid content polyamic acid solution.

[Manufacture of Transparent Polyimide Film]

39.6 g of the above copolymerized polyamic acid is taken, and the solid content is diluted to 16.5% using N,N-dimethylacetamide (DMAc). 5.6 ml of acetic anhydride and 2.9 ml of 3-methylpyridine are added respectively, and after uniformly stirring, the solution is applied to a glass plate and coated with a scraper having a gap of 900 μm. A coated sample is placed in a 50° C. oven for 20 minutes, slowly raised the temperature to 170° C. and then heated for 20 minutes. The temperature is raised to 260° C. and then heated for 20 minutes for final treatment to form a transparent polyimide film.

A is a percentage of 31% of a total number of moles of the ether-free polyamic acid to a total number of moles of the copolymerized polyamic acid, B is the mole fraction of 0.95 of ether-free dianhydride to diamine of ether-free polyamic acid, and C is a percentage of 30% of a total number of moles of the ether-free dianhydride to the total number of moles of the copolymerized polyamic acid.

Result of the formula is $((A+C)((B)^{10}+1)=0.98$.

The transparent polyimide film prepared above has a polymerization method not corresponding to the formula $((A+C)((B)^{10}+1)<1.1)$, and the tensile modulus is 4.6 GPa $((N/m^2)\times10^9)$.

The tensile elastic modulus of the above embodiments is measured in the following manner.

Measurements are performed using a Hounsfield H10K-S tensile machine in accordance with ASTM D882.

The pencil hardness of the above examples is measured in the following manner.

Measurements are performed under a load of 750 g according to the ISO 15184.

The chroma b* of the above embodiments is measured by the following method.

Measurements are performed using Japanese Electro-Color NE-4000 in a accordance with ASTM E313.

The light penetration of the above embodiments is measured in the following manner.

Measurements are performed using Japanese Electro-Color NDH-2000 in a accordance with ASTM D1003.

Test results of polymerization methods of the embodiments and comparative examples

| | aromatic cyclic dianhydride | ether-free dianhydride | diamine | polymerization method A | polymerization method B | polymerization method C | $((A+C)*((B)^{10}+1)$ >1.1 | tensile modulus GPa | pencil hardness | chroma b* | light penetration % | thickness μm |
|---|---|---|---|---|---|---|---|---|---|---|---|---|
| embodiment 1 | 6FDA | CBDA | TFMB | 41% | 0.95 | 40% | 1.31 | 5.8 | 2H | 1.6 | 89 | 50 |
| embodiment 2 | 6FDA | CBDA | TFMB | 56% | 0.80 | 50% | 1.18 | 5.4 | 2H | 1.0 | 89 | 50 |
| embodiment 3 | 6FDA | CBDA | TFMB | 51% | 0.95 | 50% | 1.63 | 7.2 | 3H | 1.8 | 89 | 50 |
| comparative example 1 | 6FDA | — | TFMB | 50% | 0.00 | 0% | 0.50 | 3.6 | 2B | 0.5 | 89 | 50 |
| comparative example 2 | 6FDA | BTDA | TFMB | 34% | 0.80 | 30% | 0.71 | 4.4 | H | 1.7 | 89 | 50 |
| comparative example 3 | 6FDA | CBDA | TFMB | 34% | 0.80 | 30% | 0.71 | 4.6 | H | 0.9 | 89 | 50 |
| comparative example 4 | 6FDA | CBDA | TFMB | 31% | 0.95 | 30% | 0.98 | 5.3 | 2H | 1.1 | 89 | 50 |
| comparative example 5 | 6FDA | BTDA | TFMB | 31% | 0.95 | 30% | 0.98 | 5.2 | 2H | 1.6 | 89 | 50 |

A is a percentage of a total number of moles of the ether-free polyamic acid to a total number of moles of the copolymerized polyamic acid.
B is the mole fraction of ether-free dianhydride to diamine of ether-free polyamic acid.
C is a percentage of a total number of moles of the ether-free dianhydride to the total number of moles of the copolymerized polyamic acid.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transparent polyimide film manufacturing method comprising following steps for producing a polyimide film having a tensile modulus of elasticity greater than 5.4 GPa ($(N/m^2) \times 10^9$), a light transmittance greater than 85%, and a chromaticity b* less than 2:
   providing an ether-free dianhydride and a diamine to form an ether-free polyamic acid;
   reacting the ether-free polyamic acid with an aromatic cyclic dianhydride to form a copolymerized polyamic acid; and
   chemically cyclizing the copolymerized polyamic acid to form a transparent polyimide film, wherein polymerization conditions thereof are as described in the following formula, $((A+C)((B)^{10}+1)>1.1$;
   wherein A is a percentage of a total number of moles of the ether-free polyamic acid to a total number of moles of the copolymerized polyamic acid;
   wherein B is a mole fraction of ether-free dianhydride to diamine of ether-free polyamic acid; and
   wherein C is a percentage of a total number of moles of the ether-free dianhydride to the total number of moles of the copolymerized polyamic acid.

2. The transparent polyimide film manufacturing method according to claim 1, wherein the ether-free dianhydride is selected from the group consisting of cyclobutanetetracarboxylic dianhydride (CBDA), 1,2,4,5-cyclohexanetetracarboxylic dianhydride (HPMDA), 1,2,4,5-benzenetetracarboxylic anhydride (PMDA), 3,3',4,4'-benzophenonetetracarboxylic dianhydride (BTDA), bicyclo[2.2.2]oct-7-ene-2,3,5,6-tetracarboxylic dianhydride (BTA), 3,3',4,4'-biphenyltetracarboxylic dianhydride (BPDA), or hexahydro-4,8-ethano-1H,3H-benzo [1,2-c:4,5-c'] difuran-1,3,5,7-tetrone (BODA).

3. The transparent polyimide film manufacturing method according to claim 1, wherein the aromatic cyclic dianhydride is selected from the group consisting of 4,4-hexafluoroisopropylidene)diphthalic anhydride (6FDA), 3,3,4,4-diphenylsulfonetetracarboxylic dianhydride (DSDA), or 4,4'-oxydiphthalic anhydride (ODPA).

4. The transparent polyimide film manufacturing method according to claim 1, wherein the diamine is selected from the group consisting of 2,2'-bis(trifluoromethyl)benzidine (TFMB), 1,4-cyclohexanediamine (CHDA), 4,4'-diamino-2,2'-dimethyl-1,1'-biphenyl (m-Tolidine), p-phenylenediamine (PDA), or 2-(4-aminophenyl)-5-aminobenzoxazole.

* * * * *